United States Patent
Mayer et al.

(10) Patent No.: US 11,643,580 B2
(45) Date of Patent: May 9, 2023

(54) METHOD FOR STRENGTHENING OF METAL STRUCTURES USING TOUGHENED 2C-EPOXY ADHESIVES

(71) Applicant: SIKA TECHNOLOGY AG, Baar (CH)

(72) Inventors: Christoph Mayer, Feusisberg (CH); David Vazquez, Madrid (ES)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 17/055,306

(22) PCT Filed: Jul. 18, 2019

(86) PCT No.: PCT/EP2019/069399
§ 371 (c)(1),
(2) Date: Nov. 13, 2020

(87) PCT Pub. No.: WO2020/016372
PCT Pub. Date: Jan. 23, 2020

(65) Prior Publication Data
US 2021/0198537 A1    Jul. 1, 2021

(30) Foreign Application Priority Data

Jul. 18, 2018  (EP) .................................... 18184224

(51) Int. Cl.
| | |
|---|---|
| *C09J 163/00* | (2006.01) |
| *C08G 59/22* | (2006.01) |
| *C08G 59/24* | (2006.01) |
| *C08G 59/50* | (2006.01) |
| *C08G 59/62* | (2006.01) |

(52) U.S. Cl.
CPC .......... *C09J 163/00* (2013.01); *C08G 59/226* (2013.01); *C08G 59/245* (2013.01); *C08G 59/5013* (2013.01); *C08G 59/621* (2013.01)

(58) Field of Classification Search
CPC .... C09J 163/00; C08G 59/226; C08G 59/245; C08G 59/5013; C08G 59/621
USPC ....................................................... 153/330
See application file for complete search history.

(56) References Cited

U.S. PATENT DOCUMENTS

| | | | |
|---|---|---|---|
| 5,707,439 A | 1/1998 | Takekoshi et al. | |
| 6,197,849 B1 | 3/2001 | Zilg et al. | |
| 6,198,849 B1 | 3/2001 | Fischer et al. | |
| 2004/0197563 A1* | 10/2004 | Kye | C09J 163/00 428/413 |
| 2013/0230726 A1* | 9/2013 | Frick | C08G 59/54 428/414 |
| 2015/0368466 A1* | 12/2015 | Kelch | C08G 18/755 523/402 |
| 2017/0107408 A1* | 4/2017 | Haag | C08L 63/00 |

FOREIGN PATENT DOCUMENTS

| | | |
|---|---|---|
| CN | 102844397 A | 12/2012 |
| EP | 1 972 646 A1 | 9/2008 |
| EP | 2 365 046 A1 | 9/2011 |
| WO | 2011/107450 A2 | 9/2011 |
| WO | 2014/072462 A2 | 5/2014 |
| WO | 2014/072515 A1 | 5/2014 |
| WO | 2016/007324 A1 | 1/2016 |

OTHER PUBLICATIONS

Sep. 16, 2019 International Search Report issued in International Patent Application No. PCT/EP2019/069399.
Sep. 16, 2019 Written Opinion of the International Searching Authority issued in International Patent Application No. PCT/EP2019/069399.

* cited by examiner

*Primary Examiner* — David T Karst
(74) *Attorney, Agent, or Firm* — Oliff PLC

(57) ABSTRACT

A method for strengthening metal structure, including steps: i) mixing two-component epoxy resin composition; ii) applying composition to metal structure surface, or onto strengthening element, or both; iii) contacting applied epoxy resin composition with strengthening element surface and/or metal structure surface wherein composition forms interlayer between metal structure and strengthening element, and iv) curing epoxy resin composition at 100° C. or below; wherein two-component epoxy resin composition contains: first component between 10-50 wt.-% of at least one epoxy resin contains on average more than one epoxy group per molecule; second component between 5-30 wt.-% of hardener for epoxy resins; between 3-25 wt.-% of at least one impact strength modifier in one or both components; between 15-80 wt.-% of at least one filler in one or both components; and wherein two-component epoxy resin composition exhibits after curing Elastic Modulus at least 2500 MPa, and Impact Peel Strength at least 15 N/mm.

15 Claims, No Drawings

METHOD FOR STRENGTHENING OF METAL STRUCTURES USING TOUGHENED 2C-EPOXY ADHESIVES

TECHNICAL FIELD

The present invention relates to the field of methods for strengthening metal structures using two-component epoxy resin compositions and strengthening elements.

PRIOR ART

An important sector of the building and construction industry is the refurbishment of time- and weather-worn structures, such as buildings and bridges. It is often commercially and logistically not viable to completely reconstructing such structures when old, yet they suffer from fatigue phenomena and increased mechanical demand over time and eventually face the risk of collapsing or severe damage.

The use of epoxy adhesives for structural strengthening applications involving the permanent fixation of strengthening elements, such as fiber reinforced plastic lamellae onto the structure to be reinforced is common practice in refurbishment and leads to significant improvement of the capacity, loadability, and general life span of these structures with minimal cost, work time, and esthetical interference. For these applications, strong epoxy adhesives are commonly used to strengthen mainly concrete substrates, such as Sikadur®-30, available from Sika Schweiz AG. Concrete is generally more brittle than the employed epoxy adhesives, thus mainly concrete failure is observed for this application. However, structural strengthening on less brittle substrates, e.g. composites or steel is more demanding. There is a large number of metal structures, e.g. steel bridges, which approach the end of their life span and partially need reinforcement, but cannot be closed for traffic or use in order to perform larger renovation or replacement operations. Welding is often not an option in metal structure refurbishment, since large area welding contributes to the mechanical weakening of the base metal structure. Up to now similar adhesives as for concrete are used as well for steel strengthening and are well known to have inferior performance, especially in regards to adhesion on steel and failure at relatively small loads/displacements due to their brittle behavior, especially under high fatigue loads (e.g. due to traffic). For the bonding of carbon fiber reinforced plastic (CRP) to concrete, the maximum anchoring length (overlap) is sufficient with a standard epoxy adhesive to obtain a secure bond. On the other hand, when bonding CRP or steel to steel substrates, that maximum anchorage length with such an adhesive is much more limited in order to ensure no adhesive failure. However, much more anchoring length would be necessary in order to have more additional force transmitted in order to provide a reliable reinforcement.

There is therefore a need for a method for strengthening metal structures in the refurbishment market using adhesives that possess fast curing characteristics under ambient conditions, non-sag properties for overhead and vertical applications, have excellent fatigue properties, and are easily applied to adhesively bond strengthening elements such as metal or fiber reinforced plastics to the metal structures to be reinforced.

DISCLOSURE OF THE INVENTION

Accordingly, it is the object of the present invention to provide a method for strengthening a metal structure leading to permanent and reliable mechanical improvement of the metal structure without facing the risk of adhesive failure.

Surprisingly, it was found that using special, highly toughened and filled two-component epoxy adhesives for bonding strengthening elements to a metal structure leads to a significant improvement of the mechanical performance of the strengthened metal structure without any of the above-mentioned problems associated with standard strong epoxy adhesives, in particular the adhesive failure phenomena.

The invention relates in a first aspect to a method for strengthening a metal structure M, comprising the steps of
i) mixing a two-component epoxy resin composition C;
ii) applying the composition C to the surface of the metal structure M, or onto a strengthening element S, or both;
iii) contacting the applied epoxy resin composition with the surface of the strengthening element S and/or the surface of the metal structure M such that the composition forms an interlayer between the metal structure M and the strengthening element S,
iv) optionally pre-stressing the strengthening element S,
v) optionally pre-fixing the strengthening element S onto the metal structure M by mechanical fixation or spot welding so that the strengthening element S is held in place before the composition is cured, and
vi) curing the epoxy resin composition at a temperature of or below 100° C., preferably of from 10 to 40° C.;
characterized in that
the two-component epoxy resin composition C contains
a first component K1 comprising between 10 and 50 wt.-%, based on the total weight of composition C, of at least one epoxy resin A that contains on average more than one epoxy group per molecule;
a second component K2 comprising between 5 and 30 wt.-%, based on the total weight of composition C, of a hardener B for epoxy resins;
between 3 and 25 wt.-%, based on the total weight of composition C, of at least one impact strength modifier I in either one or both of components K1 and K2;
between 15 and 80 wt.-%, based on the total weight of composition C, of at least one filler F in either one or both of components K1 and K2; and
wherein the two-component epoxy resin composition C exhibits after curing an Elastic Modulus of at least 2500 MPa, preferably at least 3000 MPa, measured according to DIN EN ISO 527, and an and Impact Peel Strength of at least 15 N/mm, preferably at least 20 N/mm, measured according to ISO 11343.

Other aspects of the present invention are the subject matter of additional independent claims. Especially preferred embodiments are the subject matter of the dependent claims.

WAYS OF CARRYING OUT THE INVENTION

In this entire text, the prefix "poly" in "polyisocyanate," "polyol," or "polyphenol," for example, indicates molecules that formally contain two or more of the respective functional groups.

The term "primary diamine" used in the present invention means a diamine having two terminal primary amino groups that does not contain additional secondary amino groups. An incorporation of secondary amino groups in the molecule has proven to be disadvantageous with regard to the branching possibilities of the amino group terminated impact strength modifier according to the invention in the consecutive reaction.

"Impact strength modifier" in this document means an additive to an epoxy resin matrix that, even for small additions, in particular additions of 0.1-15% by weight, causes a definite increase in toughness of the cured matrix, and thus higher bending, tensile, shock, or impact stresses can be withstood before the matrix cracks or fractures. Typically, the impact peel strength according to ISO 11343 is used as a measure of the impact strength. Here, the fracture energy (BE) is indicated as the area under the measurement curve (from 25% to 90%, according to ISO 11343). Typically, the impact peel strength according to ISO 11343 can be used as another measure of the impact strength.

The term "Elastic Modulus" refers, if not otherwise specified, to the modulus of elasticity (in the elongation range of 0.05-0.25%) as measured according to DIN EN ISO 527.

The term "polymer" as used in the present document, on the one hand, refers to a collective of chemically uniform macromolecules prepared by a polyreaction (polymerization, polyaddition, polycondensation) where, however, the macromolecules differ with respect to their degree of polymerization, molecular weight and chain length. On the other hand, the term also comprises derivatives of said collective of macromolecules resulting from polyreactions, that is, compounds which were obtained by reactions such as, e.g., additions or substitutions, of functional groups in predetermined macromolecules and which may be chemically uniform or chemically non-uniform. Moreover, the term also comprises so-called prepolymers, that is, reactive organic pre-adducts, the functional groups of which participate in the formation of macromolecules.

In this document, the use of the term "independently of one another" in connection with substituents, moieties or groups should be interpreted such that substituents, moieties or groups with the same designation may be present simultaneously in the same molecule with different definitions.

The term "room temperature" ("RT") refers to a temperature of 23° C., if not otherwise specified.

All industrial standards and norms cited refer to the most recent versions at the time of first filing of this patent application, if not otherwise specified.

The terms "weight" refers in this document to the mass of a compound or composition as measured in kilograms.

The two-component epoxy resin composition C contains a first component K1 comprising between 10 and 50 wt.-%, preferably between 12 and 48 wt.-%, in particular between 15 and 45 wt.-%, based on the total weight of composition C, of at least one epoxy resin A that contains on average more than one epoxy group per molecule.

The epoxy resin A contained in the first component K1 of composition C may be any conventional di- or multifunctional epoxy resin used in this field. Suitable epoxy resins are available e.g. from the reaction of an epoxide compound such as e.g. epichlorohydrin with a polyfunctional aliphatic or aromatic alcohol, i.e. a diol, triol or polyol. One or more epoxy resins may be used.

The epoxy resin A that contains on average more than one epoxy group per molecule is preferably a liquid epoxy resin and/or a solid epoxy resin.

The term "solid epoxy resin" is very well known to a person skilled in the art of epoxides and is used in contrast to "liquid epoxy resins". The glass transition temperature of solid resins is above room temperature, i.e. they can be comminuted to free-flowing powders at room temperature.

Suitable as an epoxy liquid resin or solid epoxy resin is in particular a diglycidyl ether, e.g. of the formula (I)

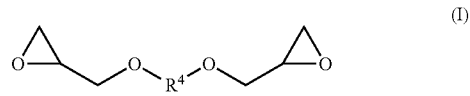

wherein $R^4$ is a divalent aliphatic or mononuclear aromatic or a dinuclear aromatic radical.

Examples of such diglycidyl ethers are in particular diglycidyl ethers of difunctional saturated or unsaturated, branched or unbranched, cyclic or open-chain $C_2$-$C_{30}$ alcohols, such as e.g. ethylene glycol, butanediol, hexanediol, or octanediol glycidyl ether, cyclohexane dimethanol diglycidyl ether, neopentyl glycol diglycidyl ether; Diglycidyl ethers of difunctional, low to high molecular weight polyether polyols, e.g. polyethylene glycol diglycidyl ether, polypropyleneglycol diglycidyl ether;

Diglycidyl ethers of difunctional diphenols and optionally triphenols, which are understood not only pure phenols, but optionally also substituted phenols.

The type of substitution can be very diverse. In particular, this is understood to mean a substitution directly on the aromatic nucleus to which the phenolic OH group is bonded. In addition, phenols are understood to mean not only mononuclear aromatics but also polynuclear or condensed aromatics or heteroaromatics which have the phenolic OH group directly on the aromatic or heteroaromatic compounds. As bisphenols and, optionally, triphenols, 1,4-dihydroxybenzene, 1,3-dihydroxybenzene, 1,2-dihydroxybenzene, 1,3-dihydroxytoluene, 3,5-dihydroxybenzoate, 2,2-bis (4-hydroxyphenyl) are, for example, suitable. propane (=bisphenol-A), bis (4-hydroxyphenyl) methane (=bisphenol-F), bis (4-hydroxyphenyl) sulfone (=bisphenol-S), naphthoresorcinol, dihydroxynaphthalene, dihydroxyanthraquinone, dihydroxy-biphenyl, 3,3-Bis (p-hydroxyphenyl) phthalide, 5,5-bis (4-hydroxy-phenyl) hexahydro-4,7-methanoindane, phenolphthalein, fluorescein, 4,4'-[bis (hydroxyphenyl)-1,3-phenylenebis (1-methyl-ethylidene)] (=bisphenol-M), 4,4'-[bis (hydroxyphenyl)-1,4-phenylenebis (1-methyl-ethylidene)] (=bisphenol-P), 2,2'-diallyl-bisphenol-A, diphenols and dicresols prepared by reacting phenols or cresols with diisopropylidenbenzene, phloroglucin, bile acid esters, phenol or cresol novolaks with —OH functionality of 2.0 to 3.5 and all isomers the aforementioned compounds.

Preferred solid epoxy resins A have the formula (II)

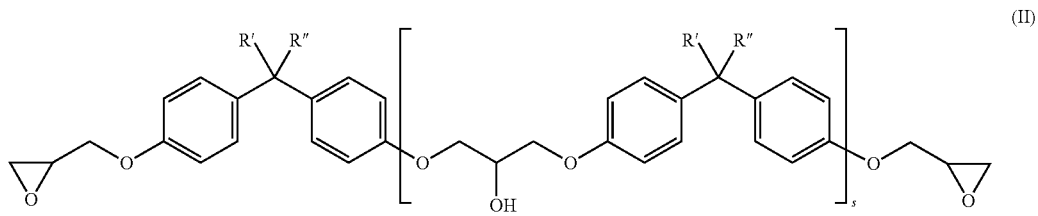

In this formula, the substituents R' and R" are each independently H or CH$_3$. In addition, the index s has a value of >1.5, in particular of 2 to 12.

Such solid epoxy resins are commercially available, for example from Dow, Huntsman or Hexion.

Compounds of the formula (II) with an index s between 1 and 1.5 are referred to by a person skilled in the art as semisolid epoxy resins. For this present invention, they are likewise considered to be solid resins. However, preferred are epoxy resins in the narrower sense, i.e. the index s has a value of >1.5.

Preferred liquid epoxy resins A have the formula (III)

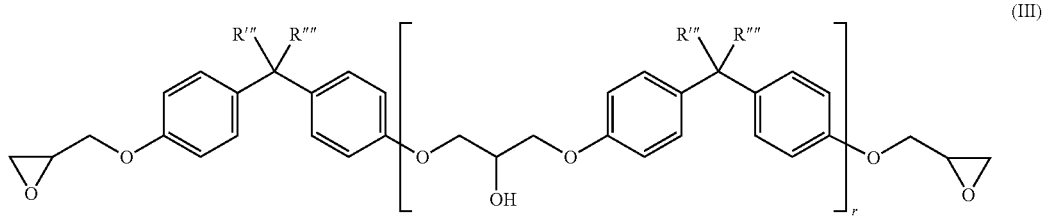

In this formula, the substituents R'" and R"" are each independently H or CH$_3$. In addition, the index r has a value of 0 to 1. Preferably, r has a value of less than 0.2.

These are thus preferably diglycidyl ethers of bisphenol A (DGEBA), of bisphenol F and of bisphenol A/F (here, the designation "A/F" refers to a mixture of acetone with formaldehyde which is used as the reactant in the preparation thereof). Such liquid resins are available, for example, as Araldite® GY 250, Araldite® PY 304, Araldite® GY 282 (Huntsman), or D.E.R.™ 331, or D.E.R.™ 330 (Olin), or Epikote 828 (Hexion).

Moreover, so-called novolacs are suitable epoxy resins A. These have in particular the following formula:

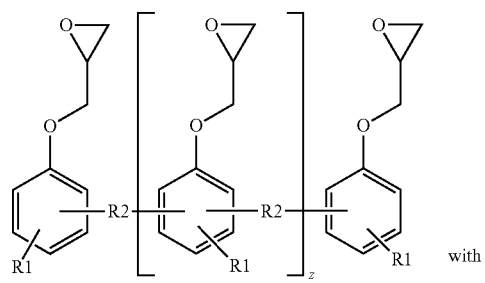

with

-continued

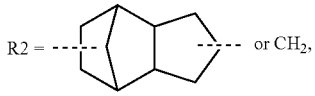

R1=H or methyl and z=0 to 7.

In particular, they are phenol or cresol novolacs (R2=CH$_2$).

Such epoxy resins are commercially available under the trade names EPN or ECN as well as Tactix®556 from Huntsman or under the product line D.E.N.™ from Dow Chemical.

Preferably, the epoxy resin A is a liquid epoxy resin of the formula (III). In an even more preferred embodiment, the heat-curing epoxy resin composition contains at least one liquid epoxy resin of formula (III) as well as at least one solid epoxy resin of formula (II).

Particular preference is given to bisphenol A diglycidyl ether, bisphenol F diglycidyl ether or bisphenol A/F diglycidyl ether, in particular Araldite® GY 240, Aralite® GY 250, Araldite® GY 281, Araldite® GY 282, Araldite® GY 285, Araldite® PY 304 or Araldite® PY 720 (all from Huntsman), or DER® 330, D.E.R.® 331, D.E.R.® 332, D.E.R.® 336, D.E.R.® 351, D.E.R.® 352, D.E.R.® 354 or D.E.R.® 356 (all from Olin), or novolak glycidyl ether.

Preferred is a novolak glycidyl ether that is derived from phenol-formaldehyde novolaks, which are also referred to as epoxy phenol novolac resins.

Such novolac glycidyl ethers are commercially available, for example from Olin, Huntsman, Momentive or Emerald Performance Materials. Preferred types are D.E.N.® 431, D.E.N.® 438 or D.E.N.® 439 (from Olin), Araldite® EPN 1179, Araldite® EPN 1180, Araldite® EPN 1182 or Araldite® EPN 1183 (from Huntsman), Epon® 154, Epon® 160 or Epon® 161 (from Momentive) or Epalloy® 8250, Epalloy® 8330 or Epalloy® 8350 (from Emerald Performance Materials).

The proportion of epoxy resin A is preferably 12-48% by weight, in particular 13-47% by weight, more preferably 15-45% by weight, based on the weight of the composition C.

Additionally, mono-, di- and multifunctional reactive diluents (e.g. butandiol diglycidylether) may be comprised in component K1 of composition C.

These reactive diluents are in particular:
- glycidyl ethers of monofunctional saturated or unsaturated, branched or unbranched, cyclic or open-chain $C_4$-$C_{30}$ alcohols, in particular selected from the group consisting of butanol glycidyl ether, hexanol glycidyl ether, 2-ethylhexanol glycidyl ether, allyl glycidyl ether, tetrahydrofurfuryl and furfuryl glycidyl ether, trimethoxysilyl glycidyl ether.
- glycidyl ethers of difunctional saturated or unsaturated, branched or unbranched, cyclic or open-chain $C_2$-$C_{30}$ alcohols, in particular selected from the group consisting of ethylene glycol, butanediol, hexanediol, or octanediol glycidyl ethers, cyclohexane dimethanol diglycidyl ether and neopentyl glycol diglycidyl ether,
- glycidyl ethers of tri- or polyfunctional, saturated or unsaturated, branched or unbranched, cyclic or open-chain alcohols, such as epoxidized castor oil, epoxidized trimethylolpropane, epoxidized pentaerythritol or polyglycidyl ethers of aliphatic polyols such as sorbitol, glycerol or trimethylol propane.
- glycidyl ethers of phenol and aniline compounds, in particular selected from the group consisting of phenyl glycidyl ether, cresyl glycidyl ether, p-tert-butyl-phenyl glycidyl ether, nonylphenol glycidyl ether, 3-n-pentadecenyl glycidyl ether (from cashew nut shell oil), N,N-diglycidyl aniline and triglycidyl of p-aminophenol.
- epoxidized amines such as N,N-diglycidyl cyclohexylamine.
- epoxidized mono- or dicarboxylic acids, in particular selected from the group consisting of glycidyl neodecanoate, glycidyl methacrylate, glycidyl benzoate, diglycidyl phthalate, tetra- and hexahydrophthalate and diglycidyl esters of dimeric fatty acids and diglycidyl esters of terephthalic acid and trimellitic acid.
- epoxidized di- or trifunctional, low to high molecular weight polyether polyols, in particular polyethylene glycol diglycidyl ether or polypropylene glycol diglycidyl ether.

Particularly preferred are hexanediol diglycidyl ether, cresyl glycidyl ether, p-tert-butylphenyl glycidyl ether, polypropylene glycol diglycidyl ether and polyethylene glycol diglycidyl ether.

Advantageously, the total proportion of the reactive diluent is from 0.1 to 20% by weight, preferably from 1 to 8% by weight, based on the weight of the total composition C.

The two-component epoxy resin composition C contains a second component K2 comprising between 5 and 30 wt.-%, preferably between 6 and 25 wt.-%, in particular between 7 and 20 wt.-%, based on the total weight of composition C, of a hardener B for epoxy resins.

This hardener B is preferably a compound or a mixture of compounds selected from the group consisting of poly (ethyleneimines), polyamidoamines, amino group terminated butadiene/acrylonitrile copolymers and polyamines.

Examples of suitable hardeners B include, for example
- aliphatic, cycloaliphatic or arylaliphatic primary diamines,
  e.g., ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonanediamine, 1,10-decanediamine, 1,11-ecanediamine, 1,12-dodecanediamine, 1,2-, 1,3- and 1,4-diaminocyclohexane, bis-(4-aminocyclohexyl)methane ($H_{12}$-MDA), bis-(4-amino-3-methylcyclohexyl)methane, bis-(4-amino-3-ethylcyclohexyl)methane, bis-(4-amino-3,5-dimethylcyclohexyl)methane, bis-(4-amino-3-ethyl-5-methylcyclohexyl)methane (M-MECA), 1-amino-3-aminomethyl-3,5,5-trimethylcyclohexane (=isophoronediamine or IPDA), 2- and 4-methyl-1,3-diaminocyclohexane and mixtures thereof, 1,3- and 1,4-bis-(aminomethyl)cyclohexane, 2,5(2,6)-bis-(aminomethyl)-bicyclo[2.2.1]heptane (NBDA), 3(4),8(9)-bis-(aminomethyl)-tricyclo[5.2.1.0$^{2,6}$]decane, 1,4-diamino-2,2,6-trimethylcyclohexane (TMCDA), 1,8-menthanediamine, 3,9-bis-(3-aminopropyl)-2,4,8,10-tetraoxaspiro[5.5]ecane and 1,3- and 1,4-xylylenediamine;
- aliphatic primary diamines containing ether groups,
  e.g., bis(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-tgrioxatridecane-1,13-diamine and higher oligomers of these diamines, bis-(3-aminopropyl)polytetrahydrofuranes and other polytetrahydrofuranediamines having molecular weights ranging, e.g., from 350 to 2000, as well as polyoxyalkylenediamines. Typically, the latter are products of the amination of polyoxyalkylene diols and can, for example, be obtained under the name Jeffamine® (from Huntsman), under the name Polyetheramin (from BASF) or under the name PC Amine® (from Nitroil). Particularly suitable polyoxyalkylenediamines are Jeffamine® D-230, Jeffamine® D-400, Jeffamine® D-2000, Jeffamine® XTJ-511, Jeffamine® ED-600, Jeffamine® ED-900, Jeffamine® ED-2003, Jeffamine® XTJ-568, Jeffamine® XTJ-569, Jeffamine® XTJ-523, Jeffamine® XTJ-536, Jeffamine® XTJ-542, Jeffamine® XTJ-559, Jeffamine® EDR-104, Jeffamine® EDR-148, Jeffamine® EDR-176; Polyetheramin D 230, Polyetheramin D 400, and Polyetheramin D 2000, PC Amine® DA 250, PC Amine® DA 400, PC Amine® DA 650, and PC Amine® DA 2000;
- Polyamines having secondary amino groups,
  e.g., diethylenetriamine (DETA), dipropylenetriamine (DPTA), bishexamethylenetriamine (BHMT), 3-(2-aminoethyl)aminopropylamine, N3-(3-aminopentyl)-1,3-pentanediamine, N5-(3-aminopropyl)-2-methyl-1,5-pentanediamine, N5-(3-amino-1-ethylpropyl)-2-methyl-1,5-pentanediamine, N,N'-dibutylethylenediamine; N,N'-di-tert.butyl-ethylenediamine, N,N'-diethyl-1,6-hexanediamine, 1-(1-methylethylamino)-3-(1-methylethylaminomethyl)-3,5,5-trimethylcyclohexane (Jefflink® 754 from Huntsman), N4-cyclohexyl-2-methyl-N2-(2-methylpropyl)-2,4-pentanediamine, N,N'-dialkyl-1,3-xylylenediamine, bis-(4-(N-alkylamino)cyclohexyl)methane, 4,4'-trimethylenedipiperidine, N-alkylated polyetheramines, e.g., the Jeffamine® types SD-231, SD-401, SD-404, and SD-2001 (from Huntsman);

amine/polyepoxide addition products, in particular additions products of the mentioned polyamines with diepoxides with a molar ratio of at least 2/1, in particular with a molar ration from 2/1 to 6/1;

Polyamidoamines which are the reaction products of a mono- or polybasic carboxylic acid or the esters or anhydrides thereof, in particular the reaction products of a dimer fatty acid, and a aliphatic, cycloaliphatic or aromatic polyamine used in a stoichiometric excess, in particular a polyalkyleneamine such as, e.g., DETA or triethylenetetramine (TETA), in particular the commercially available polyamidoamines Versamid® 100, 125, 140, and 150 (from Cognis), Aradur® 223, 250, and 848 (from Huntsman), Euretek® 3607, Euretek® 530 (from Huntsman), Beckopox® EH 651, EH 654, EH 655, EH 661, and EH 663 (from Cytec);

Polyethyleneimines (PEI).

These are branched polymeric amines derived from the polymerization of ethyleneimine. A suitable polyethyleneimine typically has an average molecular weight in the range from 250 to 25,000 g/mol and contains tertiary, secondary, and primary amino groups. Polyethyleneimines can be obtained, for example, under the trade name Lupasol® (from BASF), for example, the types Lupasol® FG, Lupasol® G20, and Lupasol® PR 8515.

Cashew nutshell based amines

These are reaction products from cardanol, the main component of cashew nutshell liquid (CNSL) and amines, leading to phenalkamine structures. These are rewewable raw materials with very good properties for use as hardener B.

Suitable polyamines are in particular polyoxyalkylenediamines having molecular weights of less than 500 g/mol (Jeffamine® D-230, Jeffamine D400, Jeffamine® EDR-148), 4,7,10-trioxatridecane-1-13-diamine, 4,9-dioxadodecane-1,12-diamines, ethylendiamine, and/or 3(4),8(9)-bis (aminomethyl)tricyclo[5.2.1.0$^{2,6}$]decane (TCD-Diamin®, manufactured by Celanese Chemicals). It has been shown that in particular polyethyleneimines having a molecular weight Mw of less than 100,000 g/mol, in particular of less than 50,000 g/mol are particularly suitable.

In particular, polyamines that preferably are diamines or triamines, are selected from the group consisting of aliphatic diamines or triamines containing ether groups, in particular polyoxyalkylenediamines and -triamines; in particular polyoxyethylenediamines and -triamines, polyoxypropylenediamines and -triamines; polyoxybutylenediamines and -triamines, amino group terminated polybutadienes and butadiene/acrylonitrile copolymers or a mixture thereof.

In particular, these are polyoxyalkylene polyamines having two or three amino groups such as are commercially available, for example, under the name Jeffamine® (from Huntsman Chemicals), under the name Polyetheramin (from BASF) or under the name PC Amine® (from Nitroil) and mixtures of the above-mentioned polyamines.

The two-component epoxy resin composition C preferably contains said hardener B with an amount of between 7 and 20 wt.-%, based on the total weight of composition C.

Furthermore, the hardener component K2 may comprise an accelerator. Suitable accelerators are substances which accelerate the reaction between amino groups and epoxide groups, in particular acids or compounds hydrolyzable to acids, in particular organic carboxylic acids such as acetic acid, benzoic acid, salicylic acid, 2-nitrobenzoic acid, lactic acid, organic sulfonic acids such as methanesulfonic acid, p-toluenesulfonic acid or 4-dodecylbenzenesulfonic acid, sulfonic acid esters, other organic or inorganic acids such as in particular phosphoric acid, or mixtures of the abovementioned acids and acid esters; Tertiary amines such as in particular the already mentioned accelerator B, or 1,4-diazabicyclo [2.2.2] octane, triethanolamine, imidazoles such as in particular N-methylimidazole, N-vinylimidazole or 1,2-dimethylimidazole, salts of such tertiary amines, quaternary ammonium salts, in particular benzyltrimethylammonium chloride, amidines, in particular 1,8-diazabicyclo[5.4.0]undec-7-enes, guanidines, in particular 1,1,3,3-tetramethylguanidine, phenols, in particular bisphenols, phenol-resins or Mannich bases such as in particular 2,4,6-tris(dimethylaminomethyl) phenol or 2,4,6-tris (N, N-dimethyl-4-amino-2-azabutyl)phenol, phosphites such as in particular di- or triphenyl phosphites, or mercapto-containing compounds. Preferred as accelerators are acids, tertiary amines or Mannich bases.

Most preferred among those is salicylic acid or 2,4,6-tris (dimethylaminomethyl)phenol or 2,4,6-tris(N,N-dimethyl-4-amino-2-azabutyl) phenol or a combination thereof.

Furthermore preferred as accelerators are in particular compounds comprising at least one dimethylamino group. in particular benzyldimethylamine, α-methylbenzyldimethylamine, N,N-diethyl-N',N'-dimethyl-1,3-propanediamine, N, N-dimethylethanolamine, 3-(N,N-dimethylamino)propane-1-ol, 2- or 4-(dimethylaminomethyl)phenol, 2,4- or 2,6-bis (N,N-dimethylaminomethyl)phenol, 2,4,6-tris(N,N-dimethylaminomethyl)phenol, 2,4,6-tris(N,N-dimethyl-4-amino-2-azabutyl)phenol or in particular N,N,N',N'-tetra-methyl-1,2-ethanediamine, N,N,N',N'-tetramethyl-1,3-propanediamine, N,N,N',N'-tetramethyl-1,4-butanediamine, N,N,N',N'-tetramethyl-1,6-hexanediamine, N, N,N',N',N"-pentamethyl-diethylenetriamine, N,N,N',N',N"-Pentamethyldipropylen-triamine, N,N,N',N',N"-pentamethyl-N-(2-aminoethyl)-1,3-propanediamine, N,N-dimethyl-1,2-ethanediamine, N,N-dimethyl-1,3-propanediamine, N,N-dimethyl-1,4-butanediamine, N,N-dimethyl-1,6-hexanediamine, 2-(2-(dimethylamino)ethylamino)ethylamine, 2-(3-(dimethylamino)propylaminoethylamine, 3-(2-(dimethylamino)ethylamino) propylamine, 3-(3-(dimethylaminopropylamino)propylamine (DMAPAPA), Bis (2-(N,N-dimethylamino)ethyl) amine or bis(3-(N,N-dimethylamino)propyl) amine.

Particularly preferred is N,N,N',N',N'''-pentamethyldiethylenetriamine, 3-(3-(dimethylamino)propylamino)propylamine (DMAPAPA) or bis(3-(N,N-dimethylamino)propyl)amine. These accelerators are easily available, have low odor and enable high compressive strengths, high adhesive forces and hardly any curing problems in the cold. Most preferred as accelerator is 3-(3-(dimethylamino)propylamino)propylamine (DMAPAPA). DMAPAPA has a low odor, is toxicologically safe and commercially available.

Furthermore, composition C comprises between 3 and 25 wt.-%, preferably between 4 and 20 wt.-%, in particular between 5 and 15 wt.-%, based on the total weight of composition C, of at least one impact strength modifier I in either one or both of components K1 and K2. This amount refers to the pure active impact modifier without solvents or other solid or liquid additives commonly used for better storage, handling, dispersion, dilution, or other purposes.

Suitable impact strength modifiers I include, for example core-shell polymers. Core-shell polymers consist of an elastic core polymer and a rigid shell polymer. Particularly suitable core-shell polymers consist of a core (core) of elastic acrylate or butadiene polymer that wraps around a rigid shell of a rigid thermoplastic polymer. This core-shell structure is formed either spontaneously by demixing a block copolymer or is predetermined by the polymerization as latex or suspension polymerization with subsequent grafting.

Preferred core-shell polymers are so-called MBS polymers, which are commercially available under the trade name Clearstrength® from Arkema, Paraloid® from Dow (formerly Rohm and Haas) or F-351® from Zeon. Particularly preferred are core-shell polymer particles which are already present as dried polymer latex. Examples are GENIOPERL® M23A from Wacker with polysiloxane core and acrylate shell, radiation-crosslinked rubber particles of the NEP series, manufactured by Eliokem, or Nanoprene® from Lanxess or Paraloid® EXL from Dow. Other comparable examples of core-shell polymers are offered under the name Albidur® from Evonik Hanse GmbH, Germany. Also suitable are nanoscale silicates in an epoxy matrix, such as those offered under the trade name Nonopox from Evonik Hanse GmbH, Germany.

Furthermore suitable as impact strength modifier I is a liquid rubber that is a carboxyl or epoxide terminated acrylonitrile/butadiene copolymer or a derivative thereof. Such liquid rubbers are e.g. commercially available under the name Hypro® (formerly Hycar®) CTBN and CTBNX and ETBN from Emerald Performance Materials LLC. Derivatives which are particularly epoxy-containing elastomer-modified prepolymers, such as those under the product line Polydis®, preferably from the product line Polydis® 36 . . . , from the company Struktol® (Schill+Seilacher Group, Germany) or under the product line Albipox® (Evonik Hanse GmbH, Germany). In another embodiment, the impact modifier is a polyacrylate liquid rubber that is completely miscible with liquid epoxy resins and segregates into micro-droplets only upon curing of the epoxy resin matrix. Such polyacrylate liquid rubbers are e.g. available under the designation 20208-XPA from Dow (formerly Rohm and Haas).

It is clear to the person skilled in the art that, of course, mixtures of liquid rubbers can also be used, in particular mixtures of carboxyl- or epoxide-terminated acrylonitrile/butadiene copolymers or derivatives thereof with epoxy-terminated or otherwise functionalized polyurethane prepolymers.

Also suitable as as impact strength modifier I is a reaction product of a carboxylated solid nitrile rubber with excess epoxy resin.

Furthermore suitable as impact strength modifier I is a polymer of the formula (IV) containing epoxide groups.

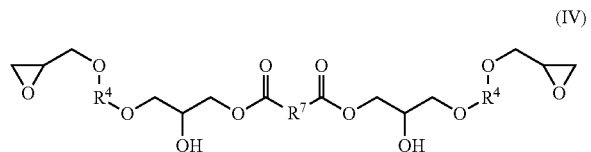

(IV)

Herein, $R^7$ is a divalent radical of a carboxyl group-terminated butadiene/acrylonitrile copolymer (CTBN) after removal of the terminal carboxyl groups. The radical $R^4$ is as defined and described above for formula (I).

Such epoxy-functional impact modifiers should only be present in component K1.

Also suitable as as impact strength modifier I is a polymer of the formula (V).

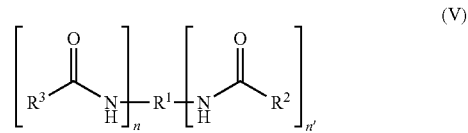

(V)

In this formula, n and n' independently of one another are each values of from 0 to 7, preferably 0 or 1 or 2, provided that n+n' is a value of from 1 to 8, in particular 1 or 2.

Moreover, $R^1$ is a linear or branched polyurethane prepolymer terminated with n+n' isocyanate groups, after removal of all terminal isocyanate groups. $R^2$ and $R^3$ are independently of one another aliphatic, cycloaliphatic, aromatic, or arylaliphatic groups with 1 to 20 C atoms and optionally heteroatoms selected from O, N, and S, in particular O and N.

If the substituents $R^2$ and $R^3$ are reactive toward epoxy groups, the impact strength modifier I of the formula (V) is a part of the component K2. If the substituents $R^2$ and $R^3$ are reactive toward amino groups, the impact strength modifier I of the formula (V) is a part of the hardener component K1. Non-reactive such impact modifiers or those that are compatible with both components K1 and K2 may be integrated in either one or both of components K1 or K2. This principle applies to all impact modifiers, not only those of formula (V).

In a preferred embodiment of an impact strength modifier according to formula (V), $R^1$ is a linear polyurethane prepolymer containing at least n+n' terminal isocyanate groups, after removal of n+n' terminal isocyanate groups;

$R^2$ and $R^3$ are residues of cardanol after removal of the hydroxyl H atom and are bonded via the oxygen atom.

Cardanol (CAS registry number: 37330-39-5) is a phenolic lipid obtained from anacardic acid, the main component of cashew nutshell liquid (CNSL), a byproduct of cashew nut processing. The name of the substance is derived by contraction from the genus *Anacardium*, which includes the cashew tree, *Anacardium occidentale*. Apart from being an especially efficient impact strength modifier, this cardanol-endcapped impact-modifier I has the advantage of being partially based on natural, renewable resources and it is inexpensive.

Cardanol is commercially available, for example under the trade name Cardolite® NC-700 by Cardolite Corporation Also suitable as as impact strength modifier I is a block copolymer, in particular a solid block copolymer. The block copolymer may be obtained from an anionic or controlled radical polymerization of methacrylic acid ester with at least one further monomer having an olefinic double bond. Preferred monomers having an olefinic double bond are those in which the double bond is conjugated directly with a heteroatom or with at least one further double bond. In particular, monomers are suitable which are selected from the group comprising styrene, butadiene, acrylonitrile and vinyl acetate. Preferred are acrylate-styrene-acrylic acid (ASA) copolymers, available e.g. under the name GELOY® 1020 from GE Plastics. Particularly preferred block copolymers are block copolymers of methyl methacrylate, styrene and butadiene. Such block copolymers are available, for example, as triblock copolymers under the group name SBM from Arkema.

Furthermore suitable as impact strength modifier I is an amino group terminated acrylonitrile/butadiene copolymer that is a part of the hardener component K2.

Also suitable as as impact strength modifier I are epoxy group-terminated polyurethane polymers wherein first a prepolymer is prepared from a di-/tri-isocyanate, a polymer polyol and an alkoxylated bisphenol, and this is then reacted with an epoxy compound containing a primary or secondary hydroxyl group. These are described in EP 1 972 646 A1.

Furthermore suitable impact strength modifiers I are described in EP 2 917 254 A1 and EP 2 917 255 A1.

The two-component epoxy resin composition C preferably contains said impact strength modifier I with an amount of between 5 and 15 wt.-%, based on the total weight of composition C.

Preferably, the weight ratio of all epoxy-functional compounds in the composition (e.g. epoxy resin, reactive diluent) to the pure impact strength modifier within the composition (without any solvents, additives, etc.) is between 1 and 3 (w/w), preferably between 1.2 and 2.9 (w/w), more preferably between 1.3 and 2.7 (w/w). This ratio enables an especially efficient toughening of the composition and the required impact peel strength and elastic modulus can thus be achieved using a broad range of different impact strength modifiers I. It is noteworthy that epoxy-functional impact strength modifiers are not considered as epoxy-functional compounds in this calculation, but always as impact strength modifiers I. Otherwise functionalized impact strength modifiers (for example, having amino groups) are of course also always accounted as impact strength modifier I in the calculation of the weight ratio.

Furthermore, composition C comprises between 15 and 80 wt.-%, preferably between 17 and 70 wt.-%, in particular between 20 and 60 wt.-%, based on the total weight of composition C, of at least one filler F in either one or both of components K1 and K2.

The use of fillers is advantageous in that they improve the aging resistance of the adhesive and advantageously influence the mechanical properties.

Suitable as filler F are inorganic and organic fillers, for example, ground or precipitated calcium carbonates, optionally coated with fatty acids, in particular stearates, barium sulfate (heavy spar), talcs, quartz flours, quartz sands, dolomites, wollastonites, kaolins, mica (potassium aluminum silicate), molecular sieves, aluminas, aluminum hydroxides, silicas (pyrogenic or precipitated), cristobalite, cements, gypsums, flue ashes, carbon blacks, graphite, metal powders such as aluminum, copper, iron, silver, or steel, PVC powders or hollow spheres, such as solid or hollow glass spheres and organic hollow spheres.

Furthermore suitable as filler F are layer minerals, in particular layered minerals exchanged with organic ions. The ion-exchanged layered mineral may be either a cation-exchanged or an anion-exchanged layered mineral. It is also possible that the adhesive simultaneously contains a cation-exchanged layered mineral and an anion-exchanged layered mineral. Such layered minerals may have the additional advantage of acting as corrosion inhibitors. If this the case and those minerals have a significant anti-corrosion effect, they should in the meaning of this invention be attributed to the anti-corrosion agents discussed further below.

The cation-exchanged layered mineral is thereby obtained from a layered mineral in which at least part of the cations have been replaced by organic cations. Examples of such cation-exchanged layered minerals are, in particular, those mentioned in U.S. Pat. No. 5,707,439 or in U.S. Pat. No. 6,197,849. Described there is also the process for the preparation of these cation-exchanged layer minerals. Preferred as a layer mineral is a layered silicate. The layer mineral is particularly preferably a phyllosilicate, as described in U.S. Pat. No. 6,198,849, column 2, line 38, to column 3, line 5, in particular a bentonite. Layer minerals such as kaolinite or a montmorillonite or a hectorite or a Illite have proven to be particularly suitable.

Preferred cation-exchanged layer minerals are known to the person skilled in the art under the name Organoclay or Nanoclay and are commercially available, for example, under the group names Tixogel® (Byk Additives & Instruments) or Nanofil® (Byk Additives & Instruments), Cloisite® (or Nanomer® (Nanocor Inc.) or Garamite® (Byk Additives & Instruments).

The anion-exchanged layered mineral may be obtained from a layered mineral in which at least some of the anions have been exchanged for organic anions. An example of an anion-exchanged layered mineral is a hydrotalcite in which at least part of the carbonate anions of the intermediate layers have been replaced by organic anions.

The filler F preferably comprises particles with a mean particle size of at least 0.1 to 1 mm, preferably at least 0.2 to 2 mm, in particular at least 0.5 to 5 mm. This offers the additional advantage that such large filler particles act as spacers that ensure a sufficiently thick adhesive layer and prevent the squeezing out of the adhesive material when the strengthening element S is pressed onto the applied adhesive.

The mean particle size of filler F is commonly determined by methods such as dynamic light scattering or, preferably, sieve analysis according to ASTM C136-06.

The two-component epoxy resin composition C preferably contains in either one or both of components K1 and K2 an anti-corrosion agent with an amount of between 1 and 15 wt.-%, preferably between 2 and 10 wt.-%, in particular between 3 and 7 wt.-%, based on the total weight of composition C.

Anti-corrosion agents, also called corrosion inhibitors, add the additional advantage that the metal structure to be strengthened does not need to be pre-treated by an anti-corrosion layer prior to application of the adhesive composition C. Without any anti-corrosion measures there is a substantial risk that the metal structure suffers from corrosion phenomena, especially at the place where the strengthening element is attached, which may significantly hinder the strengthening process and lead to adhesive failure. The use of an additional process step of applying an anti-corrosion coating prior to application of the adhesive composition C is possible, but disadvantageous since it requires an additional process step and, furthermore, creates a coating interlayer between the metal surface of the structure to be reinforced and the adhesive, which may be detrimental to the adhesion properties. Therefore, addition of an anti-corrosion agent to composition C is advantageous.

Suitable anti-corrosion agents are anodic inhibitors (also called passivation inhibitors) that act by a reducing anodic reaction and forming an insoluble, coherent and very thin film adsorbed on the metal. Some examples of anodic inorganic inhibitors are nitrates, molybdates, sodium chromates, phosphates, hydroxides and silicates, in particular calcium oxide-modified silicates and sodium silicate. Furthermore suitable as anti-corrosion agents are layered minerals, such as ground Phlogopite and micronized Muscovite, and modified hydrotalcites (MHTs), also called "layered double hydroxides" (LHDs).

Other suitable anti-corrosion agents are cathodic corrosion inhibitors. These inhibitors prevent the occurrence of the cathodic reaction of the metal. Some examples of inorganic cathodic inhibitors are the ions of the magnesium, zinc, and nickel that react with the hydroxyl ($OH^-$) of the water forming the insoluble hydroxides as (Mg(OH)$_2$, Zn(OH)$_2$, Ni(OH)$_2$) which are deposited on the cathodic site of the metal surface, protecting it. Furthermore suitable are polyphosphates, phosphonates, tannins, lignins, and calcium salts.

Furthermore suitable are organic anti-corrosion compounds that act as cathodic, anodic or together, as cathodic and anodic inhibitors. Some examples are amines, urea, mercaptobenzothiazole (MBT), benzotriazole e toliotriazole, aldehydes, heterocyclic nitrogen compounds, sulfur-containing compounds and acetylenic compounds and also ascorbic acid, succinic acid, tryptamine, caffeine and extracts of natural substances.

Moreover, the two-component epoxy resin composition C may comprise further additives. These are, for example:

- solvents, film forming auxiliaries or extenders such as toluene, xylene, methylethyl ketone, 2-ethoxyethanol, 2-ethoxyethyl acetate, benzyl alcohol, ethylene glycol, diethylene glycol butyl ether, dipropylene glycol butyl ether, ethylene glycol butyl ether, ethylene glycol phenyl ether, N-methylpyrrolidone, propylene glycol butyl ether, propylene glycol phenyl ether, diphenylmethane, diisopropylnaphthalene, mineral oil fractions such as, for example, Solvesso types (from Exxon), aromatic hydrocarbon resins, in particular phenol group containing types, sebacates, phthalates, organic phosphoric and sulfonic esters and sulfonamides;
- reactive diluents, e.g., epoxy reactive diluents which have been mentioned above, epoxidized soy oil or flax oil, compounds having acetoacetate groups, in particular acetoacetylated polyols, butyrolactone as well as, moreover, isocyanates and silicones having reactive groups;
- polymers such as, e.g., polyamides, polysulfides, polyvinylformal (PVF), polyvinylbutyral (PVB), polyurethanes (PUR), polymers containing carboxylic groups, polyamides, butadiene-acrylonitrile copolymers, styrene-acrylonitrile copolymers, butadiene-styrene-copolymers, homo- or copolymers of unsaturated monomers, in particular of the group comprising ethylene, propylene, butylene, isobutylene, isoprene, vinyl acetate, and alkyl(meth)acrylates, in particular chlorosulfonated polyethylenes and polymers containing fluorine, sulfonamide-modified melamines, and cleaned montan waxes;
- fibers, for example, of plastics, carbon, or glass;
- pigments, for example, titanium dioxide or iron oxides or organic pigments;
- rheology modifiers such as, in particular, thickeners, for example, sheet silicates such as bentonites, derivatives of castor oil, hydrogenated castor oil, polyamides, polyurethanes, urea compos, pyrogenic silicic acids, cellulose ethers, and hydrophobically modified polyoxyethylenes;
- adhesion promoters, for example, organoalkoxysilanes such as 3-glycidoxypropyltrimethoxysilane, 3-aminopropyltrimethoxysilane, N-(2-aminoethyl)-3-aminopropyltrimethoxysilane, N-(2-aminoethyl)-N'[3-(trimethoxysilyl)propyl]ethylenediamine, 3-ureidopropyltrimethoxysilane, 3-chloropropyltrimethoxysilane, vinyltrimethoxysilane, or the corresponding organosilanes with ethoxy groups or (poly)etheroxy groups instead of methoxy groups;
- oxidation, heat, light, and UV radiation stabilizers;
- flame retardants, in particular compounds such as alumina (Al(OH)$_3$; also called ATH for "aluminum trihydrate"), magnesium hydroxide (Mg(OH)$_2$; also called MDH for "magnesium dihydrate"), ammonium sulfate ((NH$_4$)$_2$SO$_4$), boric acid (B(OH)$_3$), zinc borate, melamine borate, and melamine cyanurate; compounds containing phosphorus such as ammonium phosphate ((NH$_4$)$_3$PO$_4$), ammonium polyphosphate, melamine phosphate, melamine pyrophosphate, triphenyl phosphate, diphenyl cresyl phosphate, tricresyl phosphate, triethyl phosphate, tris-(2-ethylhexyl) phosphate, trioctyl phosphate, mono-, bis-, and tris(isopropylphenyl) phosphate, resorcinolbis(diphenyl phosphate), resorcinol diphosphate oligomer, tetraphenylresorcinol diphosphite, ethylendiamine diphosphate, and bisphenol A bis(diphenyl phosphate); halogen-containing compounds such as chloroalkylphosphates, in particular tris(chloroethyl) phosphate, tris(chloropropyl) phosphate, and tris(dichloroisopropyl) phosphate, polybrominated diphenyl ethers, in particular decabromodiphenyl ether, polybrominated diphenyl oxide, tris[3-bromo-2,2-bis(bromomethyl)propyl] phosphate, tetrabromo bisphenol A, bis(2,3-dibromopropyl ether) of bisphenol A, brominated epoxy resins, ethylene-bis(tetrabromophtalimide), ethylenebis(dibromonorbornanedicarboximide), 1,2-bis-(tribromophenoxy)ethane, tris(2,3-dibromopropyl) isocyanurate, tribromophenol, hexabromocyclododecane, bis(hexachlorocyclopentadieno)cyclooctane, and chloroparaffins; as well as combinations of a halogen-containing compo and antimony trioxide (Sb$_2$O$_3$), or antimony pentoxide (Sb$_2$O$_5$);
- surfactants such as, for example, wetting agents, flow control agents, deaerating agents or defoaming agents;
- biocides, such as, for example, algicides, fungicides or substances that inhibit fungal growth.

It is clear and known to a person skilled in the art which additives may be added to the resin component K1 and which may be added to the hardener component K2. Here, in particular, it has to be ensured that the storage stability is not or only slightly impaired by such additives. Thus, it is clear to a person skilled in the art that a polyamine will react with epoxides in the resin component K1 and can consequently only be comprised in the hardener component K2.

In preferred embodiments, the two-component epoxy resin composition C contains in either one or both of components K1 and K2 additives, preferably selected from the list consisting of adhesion promoters, wetting agents, and degassing agents, with an amount of between 0.1 and 5 wt.-%, preferably between 0.25 and 4 wt.-%, in particular between 0.5 and 3 wt.-%, based on total composition C.

In the epoxy resin composition C, the ratio of the number of amine groups which are reactive toward epoxide groups relative to the number of epoxide groups is preferably in the range of 0.7 to 1.5, in particular 0.8 to 1.2.

In the epoxy resin composition C, the weight ratio of epoxy resin A, hardener B, impact modifier I, and filler F is preferably in the range of A:B:I:F=1:(0.25-1):(0.25-1):(1-4), in particular=1:(0.3-0.5):(0.3-0.5):(1.5-3.5).

The components K1 and K2 of the epoxy resin composition C are stored in separate containers. A suitable container for storing the resin K1 or hardener K2 component is in particular a barrel, a hobble, a bag, a bucket, a can, a cartridge or a tube. The components are recyclable, which means that they can be stored for several months to a year or longer before use, without changing in their respective properties to a degree relevant to their use. For the application of the epoxy resin adhesive, the resin and the hardener component K1 and K2 and an optionally present further component are mixed together shortly before or during the application.

The mixing of the components takes place by means of a suitable method. The mixing can be continuous or batchwise. If the mixing takes place before the application, care must be taken that the mixing of the components and the application does not take too much time, since this can lead to disturbances, for example to a slowed or incomplete buildup of the adhesion. The mixing takes place in particular at ambient temperature, which is typically in the range of about 0 to 40° C., preferably at about 5 to 30° C.

When mixing the components, the curing begins by chemical reaction. In this case, the epoxide groups react with the amino hydrogen-carrying amino groups and any other groups which are reactive toward epoxide groups and ring-open to give amino alcohol units. Further epoxide groups react with one another under anionic polymerization, in particular catalyzed by dimethylamino groups. As a result of these reactions, the adhesive cures to a crosslinked material. It is known to the person skilled in the art that primary amino groups are "difunctional" towards epoxide groups, meaning they can react with two separate epoxy groups.

Curing takes place especially at ambient temperature. It typically extends over a few hours to days until it is largely completed under the conditions given. Important influencing factors are the temperature, the stoichiometry and the presence of accelerators.

As a result of the curing reaction, a cured adhesive is obtained.

Preferably, the application and curing of the adhesive takes place at ambient temperature, in particular at a temperature in the range of 0 to 40° C., in particular 5 to 30° C. This allows a particularly simple handling of the adhesive and is particularly advantageous outdoors, on construction sites and in unheated industrial buildings.

The two-component epoxy resin composition C exhibits after curing an Elastic Modulus of at least 2500 MPa, measured according to DIN EN ISO 527, and an and Impact Peel Strength of at least 15 N/mm, measured according to ISO 11343. These properties are a requirement for the application of the adhesive in the method according to the present invention in order to obtain a proper mechanical strengthening of the metal structure M.

The skilled person is able to reach those properties in routine experiments by careful adjustment of the individual ingredients, in particular the impact modifier I and the filler F, of the compositions C within their respective limits as claimed.

With properties below these values, the composition is not fully suitable to perform as an excellent adhesive for strengthening of metal structures and adhesive failure is expected to occur.

Preferably, the two-component epoxy resin composition C exhibits after curing an Elastic Modulus of at least 3000 MPa, preferably at least 3250 MPa, measured according to DIN EN ISO 527.

Preferably, the two-component epoxy resin composition C exhibits after curing an Impact Peel Strength of at least 20 N/mm, preferably at least 25 N/mm, measured according to ISO 11343.

The method for strengthening a metal structure M according to the present invention comprises the steps of
i) mixing the above described two-component epoxy resin composition C;
ii) applying the composition C to the surface of the metal structure M, or onto a strengthening element S, or both;
iii) contacting the applied epoxy resin composition with the surface of the strengthening element S and/or the surface of the metal structure M such that the composition forms an interlayer between the metal structure M and the strengthening element S,
iv) optionally pre-stressing the strengthening element S,
v) optionally pre-fixing the strengthening element S onto the metal structure M by mechanical fixation or spot welding so that the strengthening element S is held in place before the applied composition C is cured, and
vi) curing the epoxy resin composition C at a temperature of or below 100° C., preferably of from 10 to 40° C.

The metal structure M may be made of any metal or metal alloy used for construction of large metal structures, such as aluminum, iron, steel or non-ferrous metals, or surface-refined metals or alloys such as galvanized or chromium-plated metals. Furthermore, it may be made of coated metals or alloys, such as powder-coated metals or alloys, or painted or varnished such materials. The surface of metal structure M may be surface-treated if necessary prior to application of the adhesive. Such pretreatments include, in particular, physical and/or chemical cleaning processes, for example grinding, sandblasting, shot peening, brushing and/or blowing off, as well as further treatment with cleaners or solvents or the application of an adhesion promoter, a primer solution or a primer.

The metal structure M is preferably a metal framework or a building, in particular a bridge.

In another preferred embodiment, said metal structure M is a metal part of a vehicle, in particular a road vehicle, an air vehicle, or a water vehicle. Said vehicle is preferably a bus, a truck, a train, a tramway, an airplane, a helicopter, a ship, a boat, or a submarine. Most preferred vehicles are large road vehicles, in particular buses, or air vehicles.

When used to strengthen the metal structure of a vehicle, the method according to the present invention has distinct advantages. First, a significant strengthening of the vehicle's metal structures can be achieved without increasing the total weight of the vehicle. This is particularly advantageous regarding efficient fuel consumption and other weight-related effects. By employing the method according to the present invention, the vehicle can be structurally strengthened, leading to higher passenger safety and crash resistance.

On the other hand, by using metal structures strengthened by the method according to the present invention, lower quality or lower mass metal structures can be used and subsequently strengthened by the method, leading to a structural stability in the same range as a higher quality or heavier, non-strengthened metal structure, but with reduced total weight. This allows for lightweight structural build, lower total weight of the vehicle and thus cost savings in manufacture, use, and maintenance of the vehicle.

The strengthening element S may be of any shape or material suitable for mechanically strengthening the metal structure M.

For example, suitable materials include:
metals or alloys such as aluminum, iron, steel or non-ferrous metals, or surface-refined metals or alloys such as galvanized or chromium-plated metals;
Wood, with resins, such as phenolic, melamine or epoxy resins, bonded wood materials or other so-called polymer composites;
Plastics, in particular hard or soft polyvinyl chloride (PVC), flexibilized poly-olefin (Combiflex®), adhesion-modified chlorosulfonated polyethylene (Hypalon®), ABS, polycarbonate (PC), polyamide (PA), polyester, PMMA, epoxy resins, PUR, POM, PO, PE, PP, EPM or EPDM, the plastics optionally being replaced by plasma, Corona or flames are surface treated; and Fiber reinforced plastics such as Carbon Fiber Reinforced Composite Plastics (CFRP), Glass Fiber Reinforced Plastics (GRP) or Sheet Molding Compounds (SMC).

In preferred embodiments, the strengthening element S is made of metal or of a composite material comprising glass fibers or carbon fibers.

Suitable shapes for the strengthening element S include, for example, flat sheets, lattices, lamellae, grids, bands, or any other shape geometrically and statically suitable for the desired purpose.

In preferred embodiments, the strengthening element S is selected from the group consisting of metal sheet, metal grid, glass fiber reinforced plastic sheet, glass fiber reinforced plastic lamella, carbon fiber reinforced plastic sheet, and carbon fiber reinforced plastic lamella. Especially preferred as strengthening element S are lamellae made of CFRP, such as those commercially available under the trade name Sika® CarboDur® S by Sika Schweiz AG.

The strengthening element S can in step v) be adhered directly to the metal structure M or can be adhered in a pre-stressed manner (see step iv)). This may include mechanical pre-stressing, i.e. by applying a pulling force alongside one axis of the strengthening element S, for example using mechanical clamps, hydraulic or pneumatic or other devices yielding a pre-stressing of the strengthening element S during application, but as well by using advanced techniques, such as shape memory alloys changing their dimensions upon heating (and subsequently curing composition C at the same time). The pre-stressing step iv) has the advantage that a damaged (e.g., cracked or partially split) concrete substrate is additionally strengthened against further propagation of the damage by the relaxation force acting on the pre-stressed strengthening element S.

Another aspect of the present invention is a kit-of-parts for strengthening a metal structure M, comprising
 a) a strengthening element S, and
 b) a two-component epoxy resin composition C, containing
  a first component K1 comprising between 10 and 50 wt.-%, based on the total weight of composition C, of at least one epoxy resin A that contains on average more than one epoxy group per molecule;
  a second component K2 comprising between 5 and 30 wt.-%, based on the total weight of composition C, of a hardener B for epoxy resins;
  between 3 and 25 wt.-%, based on the total weight of composition C, of at least one impact strength modifier I in either one or both of components K1 and K2;
  between 15 and 80 wt.-%, based on the total weight of composition C, of at least one filler F in either one or both of components K1 and K2;
 wherein the two-component epoxy resin composition C exhibits after curing an Elastic Modulus of at least 2500 MPa, measured according to DIN EN ISO 527, and an and Impact Peel Strength of at least 15 N/mm, measured according to ISO 11343.

In preferred embodiments of that kit-of-parts, the strengthening element S is made of metal or of a composite material, in particular a plastic, comprising glass fibers or carbon fibers, which may be pre-stressed during or before application.

All constituents, such as C, M, S and parameters, such as amounts of ingredients of that kit-of-parts, are the same as detailed above for the method according to the present invention. The same is true for the preferred embodiments of these constituents and their combinations.

EXAMPLES

Examples are given below which illustrate the invention further but do not limit the scope of the invention in any way and merely illustrate some of the possible embodiments. "Standard conditions" or "norm climate" ("NK") refers to a temperature of 23° C. and 50% relative humidity (r.h.).

Test Methods

The following test methods were employed:

Compressive Strength (CS) and Modulus of Compression (C-Mod) (ASTM D695)

The compressive strength and modulus of compression were determined by applying the mixed adhesive in the standard climate in a silicone mold to cuboids of the dimensions 12.7×12.7×25.4 mm. These samples were cured under standard conditions. After 7 days, a plurality of such cuboids were in each case released from the mold and compressed to destruction according to ASTM D695 at a test speed of 1.3 mm/min, the value for the compressive strength in each case being read off at the maximum force.

Tensile Strength (TS), Elongation at Break (EOB) and Elastic Modulus (E-Mod) (DIN EN ISO 527)

These mechanical properties were determined by applying and curing the mixed adhesive in the standard climate into a silicone mold to form dumbbell-shaped bars having a thickness of 10 mm, a length of 150 mm, a land length of 80 mm and a land width of 10 mm. After 7 days curing time (NK) the test specimens were released from the mold. The specimens were measured under standard conditions at a pulling speed of 2 mm/min. The tensile strength, elongation at break and the modulus of elasticity 0.05-0.25% were determined according to DIN EN ISO 527.

Lap Shear Strength (LSS) (DIN EN 1465)

To measure the lap shear strength on steel (LSS steel) several adhesive bonds were made, by applying the mixed adhesive between two heptane-degreased steel sheets in a layer thickness of 0.5 mm with an overlapping adhesive area of 10×25 mm. After a storage period of 7 days under standard conditions, the tensile shear strength was determined according to DIN EN 1465 at a tensile speed of 10 mm/min.

To measure the lap shear strength on carbon fiber composite (CFRP) (LSS CFK) several adhesive bonds were made by applying the mixed adhesive between two heptane degreased Sika® CarboDur® S512 fins in a layer thickness of 0.5 mm with an overlapping adhesive surface of 10×50. After a storage time of 7 days in the NK, the lap shear strength was determined as described.

Maximum Bending Force (MBF)

Maximum bending force was determined using the method according to the present invention and the inventive and non-inventive adhesives of Table 1, by applying the mixed adhesive on a heptane-degreased steel sheet in a layer thickness of 1 mm. This was then covered by a heptane degreased CFK lamella (Sika® CarboDur® S512), pressed together and left for curing in NK during 7 d. After that, a three-point bending test was performed with each specimen until either adhesive failure (AF) or substrate failure (SF) was observed. The maximum bending force that the reinforced steel test specimen had been bent into under this force was determined. This value gives a good quantitative indication on the strengthening of the steel by the method and the behavior under stress and displacement of the metal structure.

Impact Peel Strength (IPS) (ISO 11343)

The test specimens were prepared from the example compositions described and with electrogalvanized DC04 steel (eloZn) having dimensions 90×20×0.8 mm, where the adhesion surface area was 25×10 mm with a layer thickness of 0.3 mm. They were cured for 7 days at 23° C. The impact peel strength was measured at 23° C. according to ISO 11343 with an impact velocity of 2 m/s. The failure mode was also determined. "AF" means adhesive failure, "CF" means cohesive failure.

Tested Two-Component Epoxy Resin Compositions

The used two-component epoxy resin compositions are listed in Table 1.

TABLE 1

Tested two-component epoxy resin adhesives.

| Adhesive (supplier) | Description |
|---|---|
| SikaDur ®-30 ("SD-30") (Sika Schweiz AG) | Non-toughened reference adhesive used for structural strengthening of concrete |
| Compositions C1 to C8* | According to the present invention; details see below |
| SikaPower ®-1200 ("SP-1200") (Sika Schweiz AG) | Commercial adhesive for composite bonding in industry applications |
| Araldite ® 2015 ("Aral 2015") (Huntsman) | Commercial toughened adhesive, tough and elastic, for composite applications |
| Araldite ® 420 ("Aral 420") (Huntsman) | Commercial toughened adhesive, extremely tough and resilient, for metal, composite, thermoplastics |
| Scotch Weld DP 490 ("SW 490") (3M) | Commercial toughened adhesive, toughness and high strength for composite bonding |

*according to the invention

Example of Compositions According to Present Invention

A series of two-component example compositions (Compositions C1 to C8) was prepared using the following constituents (all wt.-% (percent by weight) values refer to the total composition C) by mixing the constituents:

Epoxy Resin

| Wt. -% | C1 | C2 | C3 | C4 | C5 | C6 | C7 | C8 |
|---|---|---|---|---|---|---|---|---|
| D.E.R. ® 331 (Olin), Bisphenol A diglycidyl ether | 22.1 | 16.6 | 17.1 | 18.8 | 18.8 | 18.5 | 16.2 | 14.6 |
| Araldite ® DY-D (Huntsman), butanediol diglycidyl ether | 1.5 | 1.7 | 1.8 | 1.8 | 1.8 | 1.7 | 1.8 | 1.8 |
| TOTAL epoxy resin A | 23.6 | 18.5 | 18.9 | 20.6 | 20.6 | 20.2 | 18.0 | 16.4 |

Hardener

| Wt. -% | C1 | C2 | C3 | C4 | C5 | C6 | C7 | C8 |
|---|---|---|---|---|---|---|---|---|
| Jeffamine ® D230 (Huntsman), polyether amine | 5 | 4.2 | 4 | 4.1 | 4.1 | 4.2 | 3.9 | 4.2 |
| Ancamine ® K54 (Evonik), 2,4,6-tris(dimethyl-aminomethyl) phenol | 1 | 0.8 | 0.8 | 0.8 | 0.8 | 0.8 | 0.8 | 0.8 |
| Jeffamine ® RFD-270 (Huntsman), aliphatic polyether amine with an acyclic alkoxylate segment and a cycloaliphatic segment | 5 | 3.3 | 3.2 | 3.3 | 3.3 | 3.3 | 3.1 | 3.3 |
| TOTAL hardener B | 11 | 8.3 | 8 | 8.2 | 8.2 | 8.3 | 7.8 | 8.3 |

Filler

| Wt. -% | C1 | C2 | C3 | C4 | C5 | C6 | C7 | C8 |
|---|---|---|---|---|---|---|---|---|
| Quartz filler (maximum particle size: 0.3 mm) | 49.5 | 55.5 | 56 | 55.15 | 55.15 | 55.6 | 54.4 | 54.6 |
| hydrophobic fumed silica | 2 | 2.6 | 2.6 | 2.6 | 2.6 | 2.6 | 2.6 | 2.6 |
| TOTAL filler F | 51.5 | 58.1 | 58.6 | 57.75 | 57.75 | 58.2 | 57.0 | 57.2 |

Impact Strength Modifier

| Wt. -% | C1 | C2 | C3 | C4 | C5 | C6 | C7 | C8 |
|---|---|---|---|---|---|---|---|---|
| Impact strength modifier I1 (see below) | 7.9 | 8.9 | — | — | — | — | — | — |
| Impact strength modifier I2 (see below) | — | — | 9.2 | — | — | — | — | — |
| Struktol ® XP 3570 (Schill + Seilacher), epoxy-funcitonal modifier | — | — | — | 7.05 | — | — | — | — |
| Struktol ® XP 3571 (Schill + Seilacher), epoxy-funcitonal modifier | — | — | — | — | 7.05 | — | — | — |
| Kane Ace ™ MX-154 (Kaneka), core-shell rubber toughener based on SBR rubber | — | — | — | — | — | 6.9 | 10.8 | — |
| Desmocap ® 11 (Covestro), branched endcapped polyurethane toughener | — | — | — | — | — | — | — | 12.2 |
| ATBN ® 1300 × 16 (Emerald Materials), amine-terminated liquid rubber | 1 | 0.8 | 0.8 | 0.8 | 0.8 | 0.8 | 0.8 | 0.8 |
| TOTAL impact strength modifier I | 8.9 | 9.7 | 10.0 | 7.85 | 7.85 | 7.7 | 11.6 | 13.0 |

Additives

| Wt. -% | C1 | C2 | C3 | C4 | C5 | C6 | C7 | C8 |
|---|---|---|---|---|---|---|---|---|
| Additives (commercial deaeration additive (Byk) and commercial adhesion promoter (silanes)) | 1 | 0.6 | 0.6 | 0.6 | 0.6 | 0.6 | 0.6 | 0.6 |
| anti-corrosion additives (mixture of different commercial products advertised for anti-corrosion properties (liquid or solid)). | 5 | 5 | 5 | 5 | 5 | 5 | 5 | 5 |
| TOTAL additives | 6.0 | 5.6 | 5.6 | 5.6 | 5.6 | 5.6 | 5.6 | 5.6 |

For testing, a homogenous mixture of above constituents forming each composition C was prepared using a stirrer and directly applied to the substrate surfaces used for preparing the test pieces. The commercial reference samples were prepared according to the specifications for the tested commercial products. For each example, the resin component and the hardener component were then processed into a homogenous paste by means of the centrifugal mixer and tested immediately as detailed above.

Synthesis of Exemplary Impact Strength Modifier 11

150 g of isocyanate-terminated prepolymer, produced from 60% by weight PolyTHF® 2000 (BASF), 40% by weight Poly BD® R45V (Cray Calley), Isophorone diisocyanate (Evonik) (0.75 equivalents) and dibutyl tin dilaurate catalyst, was treated with 1 equivalent of dry Epikote®828LVEL (Hexion). Next, 8.11 mmol phthalic anhydride (Sigma Aldrich) were added, the reaction mixture was mixed and then reacted at 110° C. under vacuum by adding catalyst.

Synthesis of Impact Strength Modifier 12

Under nitrogen atmosphere, 5687 g of Acclaim® 4200 polyol (Bayer MaterialScience) 712 g of MDI with the trade name Desmodur 44 MC L (Covestro) and 0.6 g catalyst DABCO 33 LV (Air Products) were heated with constant stirring to 80° C. and left at this temperature to produce an NCO-terminated prepolymer. After one hour of reaction time, a free NCO content was determined by titration. It had reached a content of isocyanate groups of 1.9 wt.-%. Subsequently, 910 g cardanol with the trade name Cardolite NC-700 (Cardolite) were added and stirring was continued for a further 2 hours at 80° C. The reaction was stopped as soon as free isocyanate was no longer detectable by IR spectroscopy (wavenumbers 2275-2230 $cm^{-1}$).

Mechanical Properties of Tested Two-Component Epoxy Resin Compositions

The used two-component epoxy resin adhesives of Table 1 were tested according to the methods detailed above. The results are in Tables 2 and 4.

TABLE 2

Mechanical properties of the tested two-component epoxy resin adhesives.

| | SD-30 | Comp. C1* | SP-1200 | Aral 2015 | Aral 420 | SW 490 |
|---|---|---|---|---|---|---|
| LSS steel [MPa] | 13.1 ± 3 | 23.2 ± 0.4 | 23.5 ± 1 | 14.8 ± 0.6 | 20.8 ± 5 | 21 ± 2 |
| LSS CFK [MPa] | 9.0 ± 2.4 | 23.2 ± 1 | 24.7 ± 2.4 | 21.8 ± 1.7 | 26.8 ± 3 | 26.6 ± 1.7 |
| TS [MPa] | 31.2 ± 1 | 35 ± 0.9 | 27.9 ± 1.1 | 23 ± 2 | 32 ± 7 | 32 ± 0.5 |
| E-Mod [MPa] | 8670 ± 210 | 4500 ± 120 | 2400 ± 37 | 2000 ± 100 | 1800 ± 130 | 1490 ± 60 |
| EOB [%] | 0.5 ± 0 | 1.9 ± 0.9 | 2.4 ± 0.3 | 01.5 ± 0.3 | 5.6 ± 3.4 | 4.7 ± 0.3 |
| C-Mod. [MPa] | 12580 ± 20 | 5000 ± 50 | 2400 ± 85 | 1900 ± 50 | 1940 ± 15 | 1580 ± 7.7 |
| CS [MPa] | 77.5 ± 1.5 | 75 ± 4 | 53 ± 5 | 40 ± 4 | 43 ± 1.7 | 40 ± 2.5 |
| IPS[N/mm] | 0.3 ± 4 AF | 20 ± 2 CF | 10 ± 1 CF | 10 ± 1 CF | 5 ± 0.4 AF | 4 ± 2 CF |

*according to the invention

Structural Strengthening Behavior of Tested Two-Component Epoxy Resin Compositions Some of the used two-component epoxy resin adhesives of Table 1 were tested according to the three-point bending test method detailed above. The results are in Table 3.

TABLE 3

Strengthening properties of the tested two-component epoxy resin adhesives.

| | SD-30 | Comp. C1* | SP-1200 | Aral 2015 | Aral 420 | SW 490 |
|---|---|---|---|---|---|---|
| MBF [N] | 3050 ± 160 | 3300 ± 150 | 2900 ± 100 | 2200 ± 250 | 1890 ± 100 | 2530 ± 120 |
| Failure | AF | SF | SF/AF | AF | SF | SF |

"AF" means adhesive failure,
"SF" means substrate failure of the CFK lamella.
*according to the invention

TABLE 4

Mechanical properties of the exemplary two-component epoxy resin adhesives according to the invention.

| | C1 | C2 | C3 | C4 | C5 | C6 | C7 | C8 |
|---|---|---|---|---|---|---|---|---|
| LSS steel [MPa] | 23.2 ± 0.4 | 25.0 ± 2 | 15.0 ± 4 | 15.5 ± 1 | 18.3 ± 1 | 24.0 ± 4 | 23.0 ± 3 | 20.9 ± 0.1 |
| LSS CFK [MPa] | 23.2 ± 1 | 21.0 ± 1 | 25.0 ± 0.6 | 23.2 ± 0.4 | 26.4 ± 1 | 30.8 ± 0.2 | 28.9 ± 0.1 | 15.9 ± 0.1 |
| TS [MPa] | 35 ± 0.9 | 27.0 ± 1 | 27.4 ± 0.2 | 29.5 ± 0.1 | 28.0 ± 2 | 33.0 ± 4 | 32.0 ± 2 | 24.4 ± 0.1 |
| E-Mod [MPa] | 4500 ± 120 | 4100 ± 300 | 3500 ± 100 | 3200 ± 200 | 3900 ± 30 | 4500 ± 120 | 4600 ± 100 | 2550 ± 120 |
| EOB [%] | 1.9 ± 0.9 | 3.0 ± 0.2 | 2.0 ± 02 | 2.0 ± 0.1 | 1.2 ± 0.4 | 0.8 ± 0.3 | 2.0 ± 1 | 2.8 ± 0.2 |
| C-Mod. [MPa] | 5000 ± 50 | 4600 ± 30 | 4500 ± 150 | 4300 ± 200 | 2600 ± 80 | 6600 ± 200 | 5200 ± 300 | 3100 ± 200 |
| CS [MPa] | 75 ± 4 | 70 ± 1 | 56.4 ± 1.4 | 66 ± 1 | 62 ± 1 | 64 ± 4 | 60 ± 2 | 56 ± 1 |
| IPS [N/mm] | 20 ± 2 CF | 16 ± 2 CF | 21 ± 5 CF | 15 ± 2 CF | 17 ± 1 CF | 15 ± 2 CF | 22 ± 1 CF | 15 ± 2 CF |
| Epoxy: Impact strength modifier** | 2.7 | 1.9 | 1.9 | 2.6 | 2.6 | 2.6 | 1.6 | 1.3 |

**weight/weight ratio of all epoxy-functional compounds to all impact strength modifiers.

The invention claimed is:

1. A method for strengthening a metal structure M, comprising the steps of
   i) mixing a two-component epoxy resin composition C;
   ii) applying the composition C onto a strengthening element S, or both onto the strengthening element S and to a surface of the metal structure M, wherein the strengthening element S is made of a composite material comprising glass fibers or carbon fibers;
   iii) contacting the applied epoxy resin composition with the surface of the strengthening element S and/or the surface of the metal structure M such that the composition forms an interlayer between the metal structure M and the strengthening element S,
   iv) optionally pre-stressing the strengthening element S,
   v) optionally pre-fixing the strengthening element S onto the metal structure M by mechanical fixation or spot welding so that the strengthening element S is held in place before the composition is cured, and
   vi) curing the epoxy resin composition at a temperature of or below 100° C.;
   wherein
   the two-component epoxy resin composition C contains
   a first component K1 comprising from 18.0 to 23.6 wt.-%, based on the total weight of composition C, of at least one epoxy resin A, comprising at least predominantly a bisphenol A diglycidyl ether;
   a second component K2 comprising 8.2 to 11 wt.-%, based on the total weight of composition C, of an amine-based hardener B for epoxy resins;
   7.7 to 11.6 wt.-%, based on the total weight of composition C, of at least one impact strength modifier I in either one or both of components K1 and K2, the impact strength modifier I being selected from the group consisting of polyurethane-based modifiers and core-shell rubbers;
   51.5 to 60 wt.-%, based on the total weight of composition C, of at least one filler F consisting of quartz and fumed silica, in either one or both of components K1 and K2; and
   wherein the two-component epoxy resin composition C exhibits after curing an Elastic Modulus of at least 2500 MPa, measured according to DIN EN ISO 527, and an Impact Peel Strength of at least 15 N/mm, measured according to ISO 11343.

2. The method according to claim 1, wherein the composite material comprises the carbon fibers.

3. The method according to claim 1, wherein the strengthening element S is selected from the group consisting of glass fiber reinforced plastic sheet, glass fiber reinforced lamella, carbon fiber reinforced plastic sheet, and carbon fiber reinforced lamella.

4. The method according to claim 1, wherein the two-component epoxy resin composition C contains in either one or both of components K1 and K2 an anti-corrosion agent with an amount of between 1 and 15 wt.-%, based on the total weight of composition C.

5. The method according to claim 4, wherein the two-component epoxy resin composition C contains the anti-corrosion agent with an amount of between 2 and 10 wt.-%, based on the total weight of composition C.

6. The method according to claim 1, wherein the filler F comprises particles with a mean particle size of at least 0.1 to at least 1 mm.

7. The method according to claim 1, wherein the weight ratio of all epoxy-functional compounds in the composition to pure impact strength modifier I in the composition is between 1 and 3.

8. The method according to claim 1, wherein the weight ratio of epoxy resin A, hardener B, impact strength modifier I, and filler F in composition C is in the range of A:B:I:F=1:(0.25-1):(0.25-1):(1-4).

9. The method according to claim 1, wherein the metal structure is a building or a metal part of a vehicle.

10. The method according to claim 1, wherein the metal structure is a bridge.

11. The method according to claim 1, wherein the impact strength modifier I comprises a polymer of the formula (V),

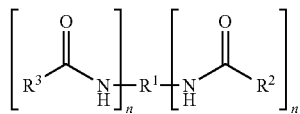 (V)

where
- n and n' independently of one another are each values of from 0 to 7 with the proviso that n+n' is a value of from 1 to 8,
- $R^1$ is a linear or branched polyurethane prepolymer terminated with n+n' isocyanate groups, after removal of all terminal isocyanate groups, and
- $R^2$ and $R^3$ are, independently of one another, aliphatic, cycloaliphatic, aromatic, or arylaliphatic groups with 1 to 20 C atoms, which optionally contain heteroatoms selected from O, N, and S.

12. The method according to claim 11, wherein in the polymer of the formula (V), n+n' is 1.

13. The method according to claim 11, wherein in the polymer of the formula (V), n+n' is 2.

14. The method according to claim 11, wherein in the polymer of the formula (V), $R^2$ and $R^3$ are, independently of one another, the aliphatic groups with 1 to 20 C atoms, which optionally contain heteroatoms selected from O and N.

15. The method according to claim 11, wherein in the polymer of the formula (V), $R^2$ and $R^3$ are, independently of one another, the cycloaliphatic, aromatic, or arylaliphatic groups with 3 to 20 C atoms, which optionally contain heteroatoms selected from O and N.

\* \* \* \* \*